United States Patent [19]

Karhumäki

[11] Patent Number: 5,024,039
[45] Date of Patent: Jun. 18, 1991

[54] ENGAGEMENT PROFILE OR BEAM

[76] Inventor: Markku Karhumäki, Erkyläntie, SF-11130 Riihimäki, Finland

[21] Appl. No.: 449,379

[22] Filed: Dec. 6, 1989

Related U.S. Application Data

[63] Continuation of Ser. No. 162,391, Mar. 4, 1988, abandoned.

[30] Foreign Application Priority Data

Jul. 4, 1986 [FI] Finland ................................. 862835

[51] Int. Cl.$^5$ ................................................ E04C 3/07
[52] U.S. Cl. .......................................... 52/735; 52/700; 52/730; 52/732
[58] Field of Search .................. 52/732, 735, 730, 700, 52/720, 404, 481; 411/457, 461, 466

[56] References Cited

U.S. PATENT DOCUMENTS

| 826,042 | 7/1906 | Loveley | 52/735 |
|---|---|---|---|
| 2,240,502 | 5/1941 | Hall | 52/735 |
| 2,283,167 | 5/1942 | Burson | 411/461 |
| 2,318,776 | 5/1943 | Haug | 411/461 |
| 3,212,389 | 10/1965 | Sanford . | |
| 3,243,930 | 4/1966 | Slowinski | 52/732 |
| 3,498,170 | 3/1970 | Sanford . | |
| 3,696,572 | 10/1972 | Jureit | 52/735 |
| 3,708,942 | 1/1973 | Leonard | 411/466 |
| 4,143,500 | 3/1979 | Sanford . | |
| 4,346,544 | 8/1982 | Larssen | 52/481 |
| 4,641,474 | 2/1987 | Cannarsa | 411/466 |

FOREIGN PATENT DOCUMENTS

| 66453 | 6/1984 | Finland . | |
|---|---|---|---|
| 73284 | 5/1987 | Finland | 52/730 |
| 126038 | 12/1972 | Norway . | |

Primary Examiner—Michael Safavi
Attorney, Agent, or Firm—Pollock, Vande Sande & Priddy

[57] ABSTRACT

A beam or the like, substantially manufactured from rather thin sheet metal either by bending or some other suitable technique and comprising at least one side as well as a fastening strip joining with its edge and positioned at a straight or inclined angle relative to said side. The beam fastening strips and in some cases intermediate strips are provided with studs having a rather dense spacing in longitudinal direction. As the bearing member of a jointing structure, said beam is intended to be secured to a building panel or the like made of wood or a similar material, such as woodboard, boarding chipboard, gypsum board or concrete slab by pressing it against such a panel, so that said studs penetrate into a panel and secure the beam, or by placing said beam on top of a just cast, fresh concrete slab, whereby the studs effect the securing as the concrete sets. The invention is mainly characterized in that the intermediate strips and/or fastening strips of a beam are fitted with reinforcement lists extending lengthwise of the beam for improving the bending strength of the beam.

9 Claims, 5 Drawing Sheets

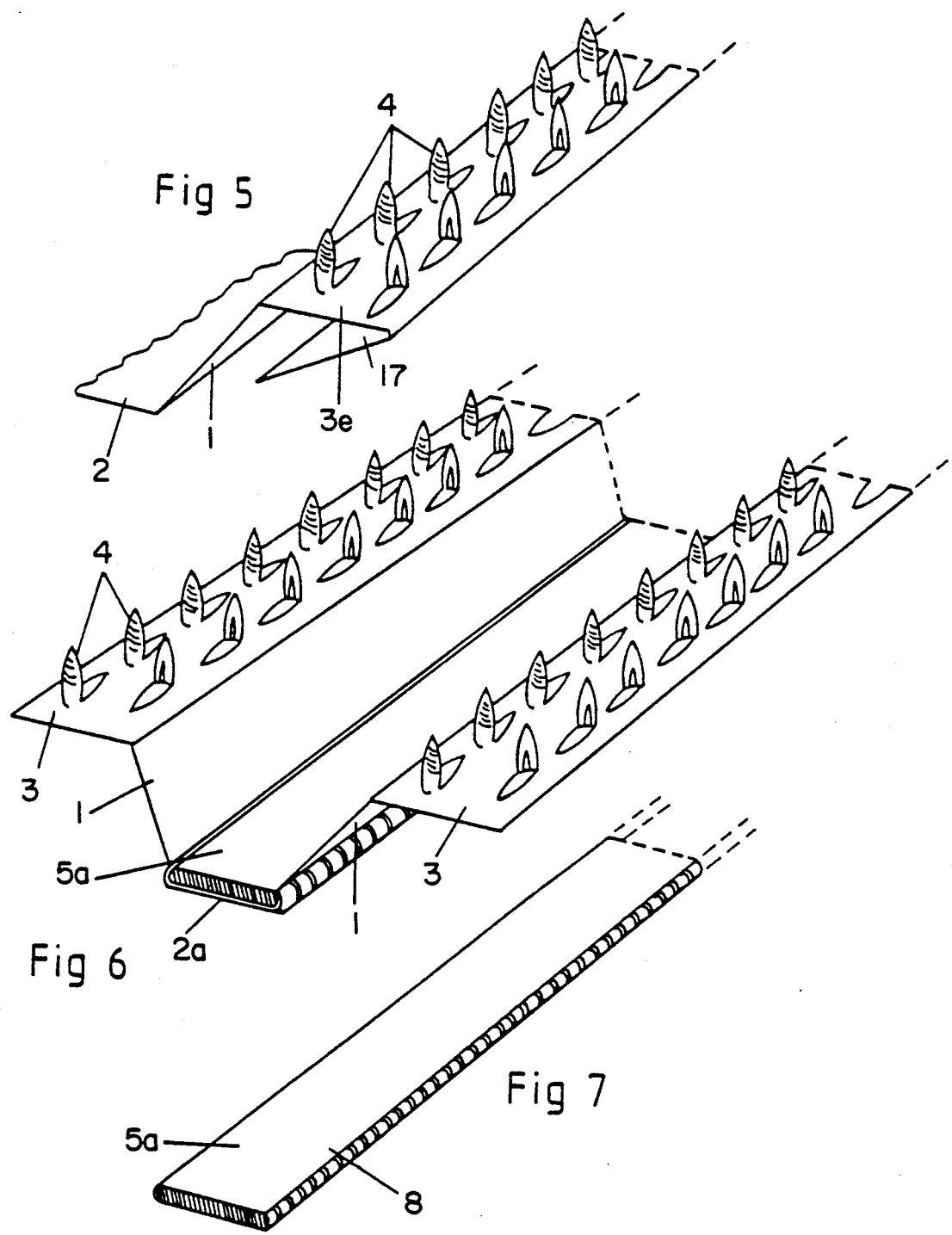

ENGAGEMENT PROFILE OR BEAM

This application is a continuation of Ser. No. 162,391, filed on Mar. 4, 1988 now abandoned.

BACKGROUND OF THE INVENTION

The present invention relates to a so-called engagement profile or a beam.

A beam according to the present invention is preferably made of thin steel plate by bending in such a way that the beam comprises one or several web plates extending lengthwise of the beam substantially at a constant distance from each other and perpendicular or inclined relative to the fastening plane of the beam. These web members are interconnected by members of the same sheet material. Thus, the beam is preferably made of a single sheet blank. For fastening it to its underlaying bed, the beam further comprises one or several fastening strips, which are preferably integral parts of the web members and whereby the beam is fastened to a board supported by said beam. Such a supported board can be made of wood, such as boards, woodboard, plywood, blockboard, chipboard, fiberboard, gypsum board or the like, into which the engagement profiles formed in a known manner on fastening strips sink and engage as the strips are clamped against the board e.g. by means of a suitable press. The beam can also be used for supporting and reinforcing a concrete slab, whereby it is placed on top of a concrete slab during its casting prior to the setting of concrete, with the studs engaging in concrete. Thus, in a particularly preferred case, the studs are designed so that the blade side of studs is provided with a transverse toothing or roughening, as disclosed in the Applicants' earlier Finnish Pat. No. 65643.

A drawback with the above type of beam is, however, a relatively weak strength under major stresses as the sheet material of such beam is thin, the sheet thicknesses being e.g. 1-1.5 mm. Such a thin sheet material begins to fracture quite easily because of buckling. In order to provide a beam with greater strength, it can of course be made of a thicker sheet material. However, manufacturing will be more difficult and costs will be higher because the raw material is more expensive and working is more difficult. Especially, the preparation of engagement studs will be more difficult with thicker sheet material.

When studying tensions in the above type of beam it can be noted, especially as far as bending is concerned, that the greatest stresses occur in the upper and lower portions of the beam cross-section while in the midportion, in a so-called neutral plane, the stress is zero. In the upper edge of the cross-section, for example in fastening strips, there prevails a compression stress while in the lower edge there is accordingly a tensile stress. Some of the stress in the fastening strips is naturally taken up by the plate or board which is supported by the beam, but if this plate is weak, the stress on the strips may become too great, especially since such strips are weakened by the reduction in the amount of basic material as a result of stamping of the studs.

The object of the invention is thus to provide a solution to the above problems and to improve the strength of an engagement beam without substantially increasing the actual material thickness of a beam so as not to unduly increase the weight and manufacturing costs of a beam.

The invention will now be described in more detail with reference made to the accompanying drawings which illustrate a few preferred embodiments of the invention and their details and advantages. In the drawings

BRIEF DESCRIPTION OF THE DRAWINGS

FIGS. 2-5 are perspective partial views showing mainly diagrammatically different embodiments of the fastening strips for a beam of the invention, FIG. 6 is another perspective view showing an embodiment of the invention in which the main reinforcement strip comprises a flat steel strip, FIG. 7 is a partial view of the reinforcement strip of the preceding embodiment.

DETAILED DESCRIPTION OF THE PREFERRED EMBODIMENTS

Figure 1:
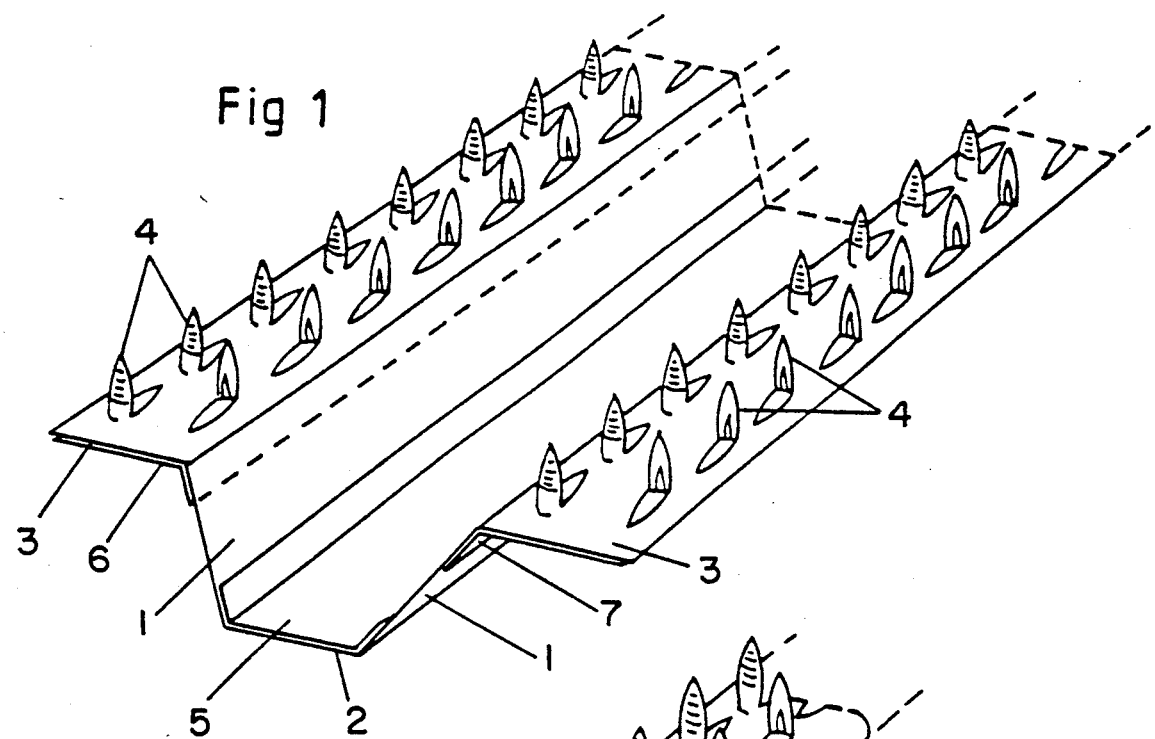
FIG. 1 is a perspective view of one preferred embodiment of a beam of the invention as seen obliquely from the front.

A beam shown in the embodiment of FIG. 1 comprises a sheet blank, for example a blank of 1-2 mm thick, galvanized or black steel sheet, which is bent either by means of a bending press or by rolling into a shaped member having a flat-bottomed V configuration, wherein sides 1 serve as web portions interconnected by an intermediate strip 2. Joined to the ends of sides 1 are fastening strips 3, formed in a known manner with fastening studs or teeth 4 for fastening the beam to a sheet blank or a boarding to be supported or reinforced for example by compressing with an appropriate press so that studs 4 are tightened in a sheet blank. Studs 4 are preferably fitted with a transverse roughening or teeth for securing them more firmly than smooth studs. The beam can also be used for reinforcing concrete slabs, especially rather thin slabs, the beams being placed on top of a concrete slab inside a casting mould during the casting of concrete so as to set the studs completely inside the concrete. After the concrete is set, the result is a firm and relatively rigid, but still rather light concrete slab element, which is suitable for a wall or floor element. Of course, the concrete can be further reinforced for example with a steel-wire mesh. According to the invention, the beam is reinforced by fitting the most stress-laden parts thereof with reinforcement strips 5, 6, 7, extending lengthwise of the beam and preferably made of the same material as the beam itself. The first reinforcement strip 5 is thus placed at intermediate strip 2 outside and/or inside extending crosswise slightly on top of the web portions. In addition, further reinforcement strips 6, 7 are placed upon fastening strips 3, for example on the opposite side of studs 4, and those also extend slightly on top of the web portions. The reinforcement strips of this embodiment are preferably secured by means of resistance welding, such as disc welding, with the joining proceeding lengthwise of the beam.

Figure 2:
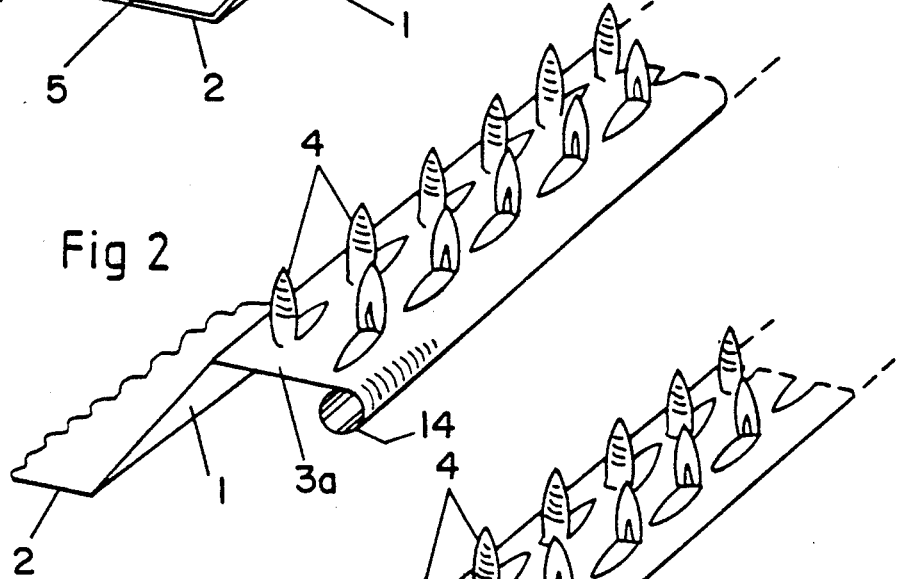
Figure 3:
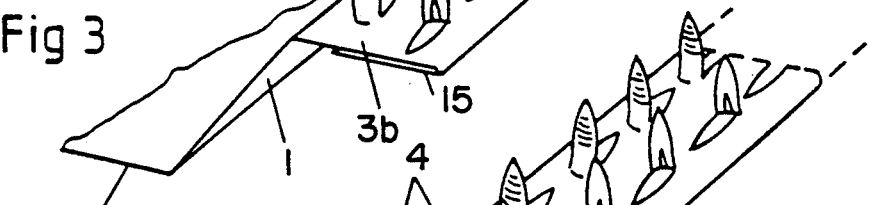
Figure 4:
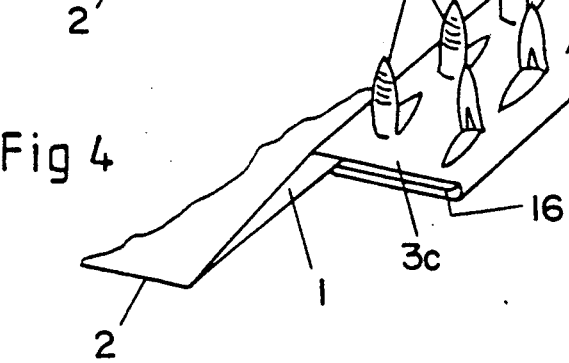

The reinforcement of fastening strips 3a, 3b, 3c, 3d can also be achieved preferably by making the fastening strips originally somewhat wider and then, after punching out the studs, by bending the extra width into a round hem 14 (FIG. 2), a single hem 15 (FIG. 3), a double hem 164 (FIG. 4) or an open fold 17 (FIG. 5). The reinforcement of fastening strips prevents them from buckling under major stresses, especially if the basic material, for example the building slab to be supported, has poor bearing strength or if a boarding structure is to be supported with a gap between individual boards.

Figure 9:
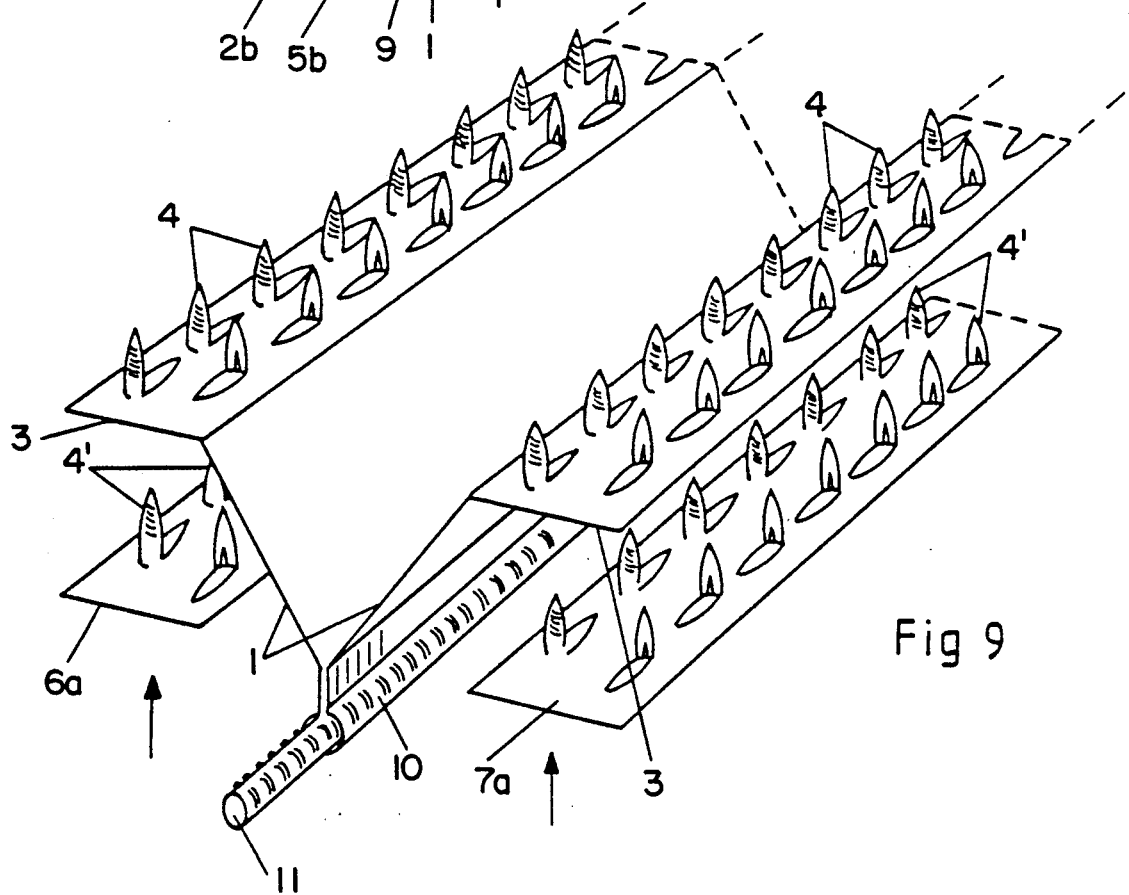
FIG. 9 shows an embodiment in which the reinforcement strips include studs the same way as fastening strips.

FIG. 6 illustrates another embodiment of the invention, wherein the cross-section of a beam is substantially in the shape of a flat-bottomed V, such as in the preceding embodiment shown in FIG. 9. In this embodiment, the main reinforcement is provided by a flat reinforcement strip 5a which is preferably fastened in contact with the inner beam surface upon the intermediate strip 2a. The fastening can be made even more effective in one of the following manners. The connection between sides 1 and intermediate strip 2 of a profiled beam can be rounded so as to partially surround the edge of reinforcement strip 5a. The width of reinforcement strip 5a is selected to slightly exceed the internal width of intermediate strip 2 where it is mounted on a profiled beam. Furthermore, the side edges of a reinforcement strip can be provided with roughenings or ribs 8 (FIG. 7), which secure firmly to the walls of its mounting spot as reinforcement strip 5 is forced in position in a press by means of a suitable tool and back stop or by rolling.

Figure 8:
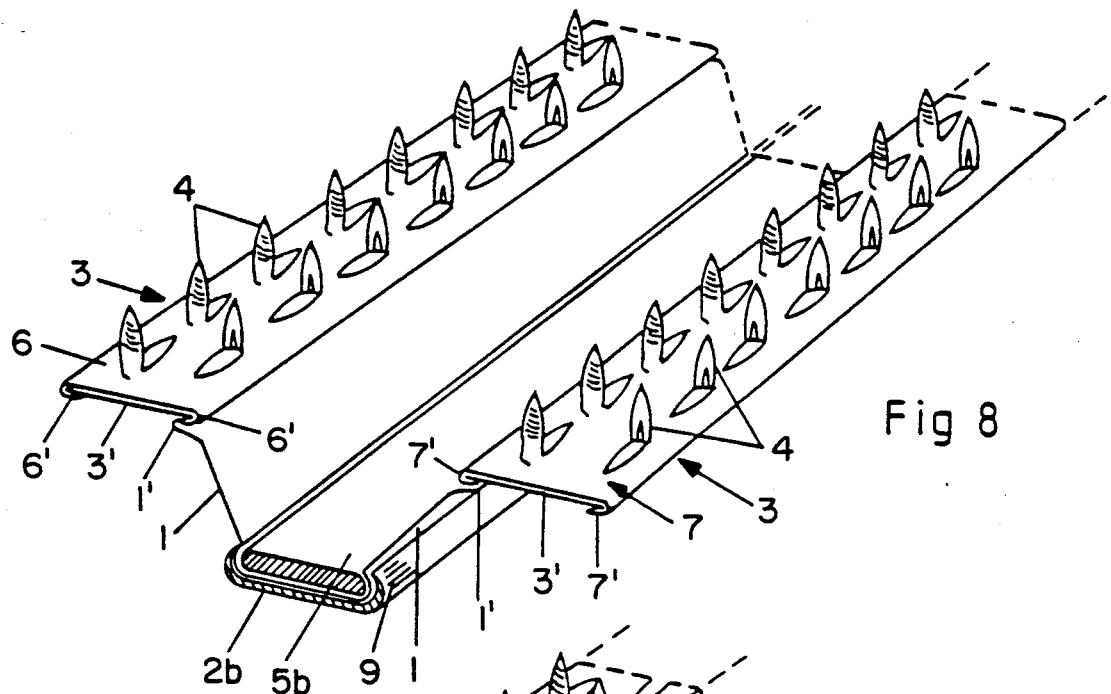
FIG. 8 is a partial view of one modification of the embodiment shown in FIG. 6.

FIG. 8 discloses a modification of the embodiment shown in FIG. 6, wherein the fastening of a reinforcement strip 5b is secured with a profiled strip, designed so that its bent side portions clamp the side edges of intermediate strip 2b of the beam for locking reinforcement strip 5b in position. Profiled strip 9 is dimensioned so that the distance of its side portions from each other is slightly less than the width of intermediate strip 2b of the beam so, when clamping it in position, there will be a stress caused by deflection which clamps reinforcement strip 5b firmly in position. Profiled strip 9 can also be provided with studs for fastening a beam with two board.

According to another embodiment of the invention (FIG. 8), the reinforcement of a beam can also be provided in such a manner that fastening strips 3 comprise base strips 3', which are smooth, without studs 4, and join with sides 1, as well as reinforcement strips 6, 7 formed with studs 4. Reinforcement strips 6 and 7 are secured to base strips 3' e.g. by means of integrally formed welts 6', 7' by compressing or rolling the welts closed after pushing reinforcement strips 6, 7 into position on top of base strips 3'. For this engagement, the upper edge of sides 1 of the beam and the junction of base strips 3' are appropriately shaped so as to produce a bead 1' for securing the edge of the welt of a reinforcement strip therebelow.

In the embodiment shown in FIG. 9, fastening strips 3 are provided with studs 4. In addition to that, the reinforcement strips 6a, 7a are also provided with studs 4', whose spacing is at least substantially the same as that of the former studs. Such reinforcement strips are intended to be fastened in position after securing a beam firmly to a slab to be strengthened, whereby the reinforcement strips are compressed into position so that their studs 4' pass through the stud holes in fastening strip 3.

In the embodiment of FIG. 9, the reinforcement strip is made of a round, so-called ribbed steel bar. Therefore, the lowest part of the beam cross-section is designed as a tube 10 for inserting a round ribbed steel bar 11 therein. After being inserted ribbed bar 11 is secured even more firmly by shaping a tube 10 for example by lateral pressing to make it conform to the shape of a ribbed steel bar.

It is also possible to have several tubular members 10 as well as ribbed steel bars 11 serving as a reinforcement strip. Tube 10 can be made of sides 1 or it can be made separately and attached to a web plate.

Figure 10:
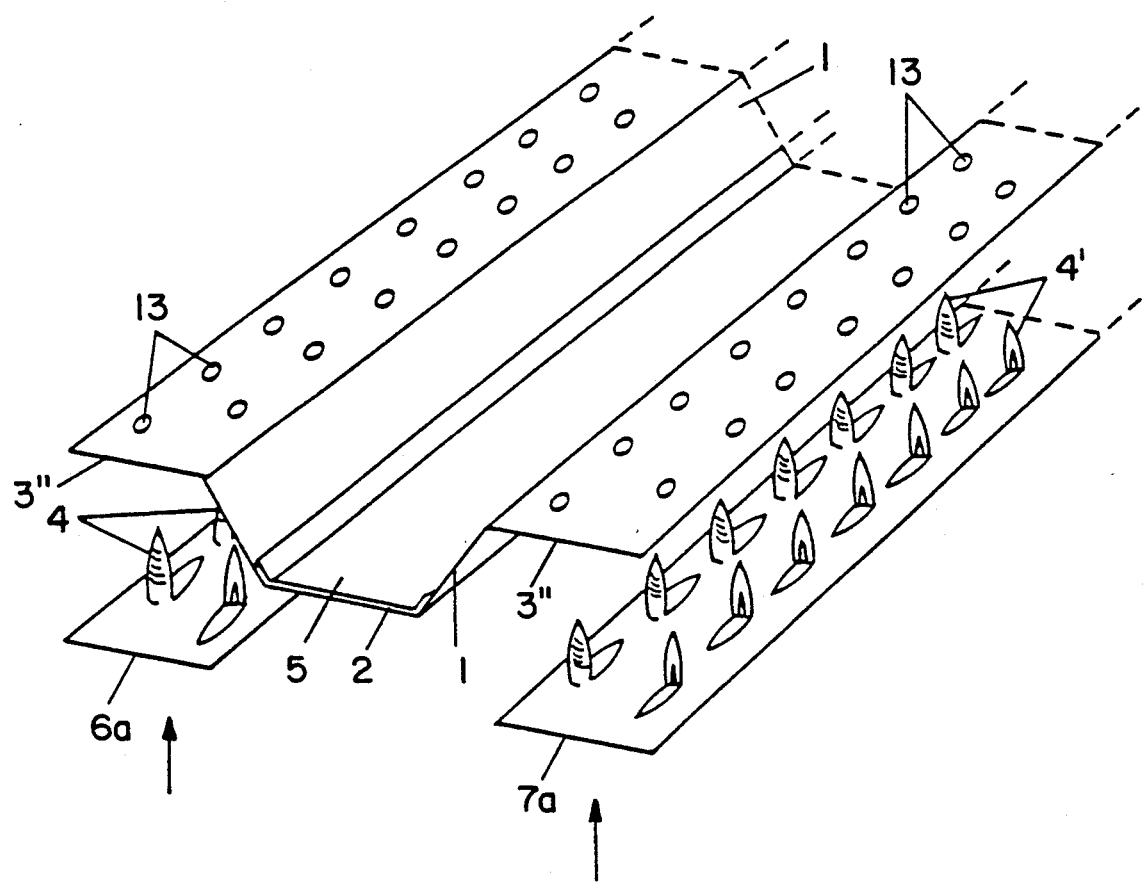
FIG. 10 shows one modification of the embodiment shown in FIG. 9.

The embodiment shown in FIG. 10 is a combination of the embodiments shown in FIGS. 8 and 9. In this embodiment, a fastening strip 3 consists of smooth cover strips 3", joining with sides 1 and provided with holes 13, as well as of reinforcement strips or lists 6a, 7a fitted with studs 4' the same way as in the embodiment of FIG. 9. These studs have the same spacing as holes 13 in cover strips 3". When it is secured, the beam is first pressed against an engagement board so that cover strips 3" come against the engagement board, whereafter the actual fastening is effected by pressing reinforcement members 6a, 7a in, so that their studs 4' penetrate into the engagement board through holes 13 in cover strips 3".

Figure 11:
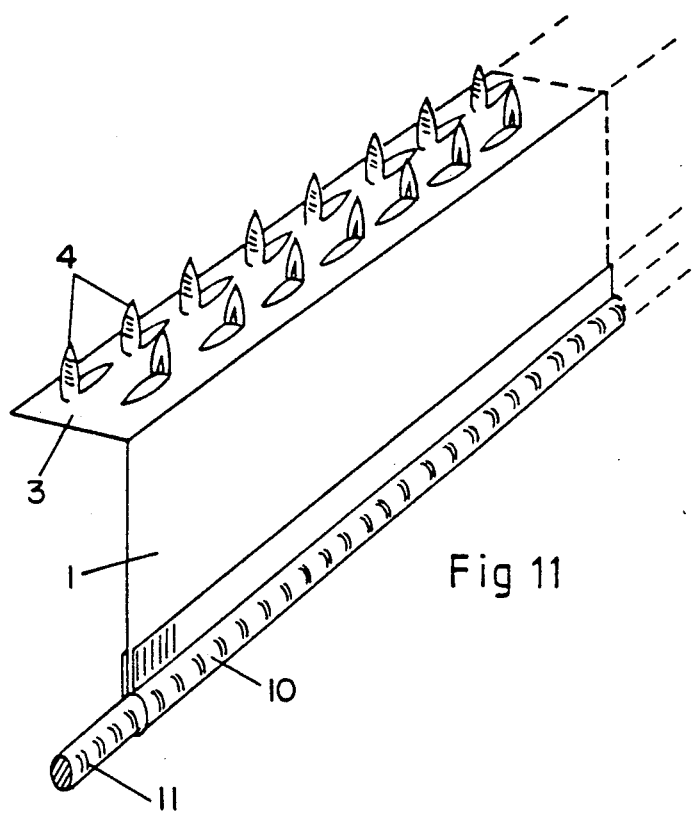
FIG. 11 shows an ambodiment in which the reinforcement strip comprises a steel bar and FIG. 12 shows yet another embodiment of the beam.

In a very simple embodiment shown in FIG. 11, a beam of the invention only comprises a single side 1 and a single studded fastening strip 3, bent to an angle of about 90° relative to the single side 1. The lower edge of a web plate is provided with a tubular member 10, into which is fitted and secured a ribbed steel bar 11 serving as a reinforcement member the same way as above. Side 1 can be corrugated in a longitudinal direction to provide a required rigidity.

Figure 12:
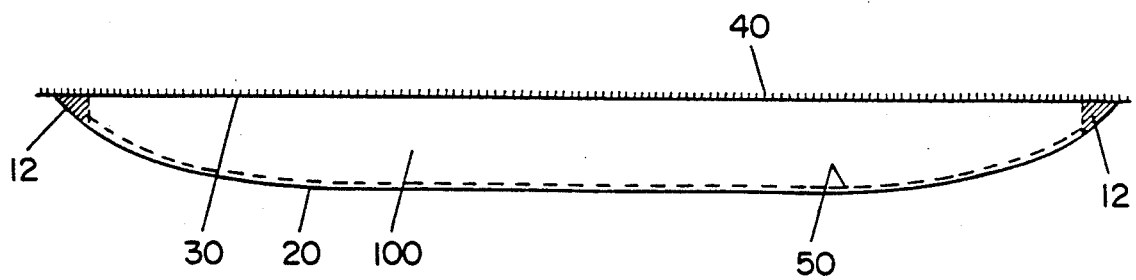

In the above embodiments, a beam of the invention has been considered to have an equal height over its entire length. It is within a scope of the invention, however, to make a beam converging at both ends, thus reducing the height of a profile towards the ends. FIG. 12 shows such a beam diagrammatically in side view. The ends of side 1 can be further provided with means 12 for locking the ends of ribbed steel bars 11. Thus, it is also possible to give the reinforcing steels a prestress to increase the bearing capacity of a beam. The beam shown in FIG. 12 may have, for example, a V-shaped cross-section.

A beam as shown in FIG. 12 can be preferably manufactured by deep drawing technique, whereby the cross-section of a beam is substantially in the shape of a flat-bottomed V the same way as in FIG. 7. The reinforcement list can thus be a flat steel strip 50, fixed in position in a conventional manner. The design shown in FIG. 12 offers the advantage that even the gable edges of a beam will be provided with fastening studs, whereby the beam does not easily disengage from its position under varying loads over a longer period of time.

The above describes but a few examples of beam embodiments within the scope of the present invention. It is obvious that the structures of these embodiments can still be arbitrarily combined with each other to create further embodiments which can thus be considered as part of the invention. It should also be noted that in certain cases a beam may have several sides 1 and fastening strips 3 as well as intermediate strips 2, whereby the cross-section of a beam can be in the shape of W. The beam can be manufactured from either galvanized or black steel sheet. In the latter case, a finished, reinforced beam can be subjected to hot-dip galvanizing in a conventional manner. In certain cases, this might even improve the fastening of a reinforcement member, the galvanizing having the same effect as soldering. The cross-sectional shape of a beam may have a variety of alternatives in different embodiments. One and the same beam can be provided with one or a plurality of reinforcement members 5 or 11

I claim:

1. A beam for use in construction for fastening to a building construction element in a bearing portion of a joint structure comprising:
   a beam-shaped member made of a substantially thin sheet metal and including:
   two side members;
   two fastening strips, each fastening strip extending outwardly in an angular position from a first edge of one of said respective side members;
   an intermediate strip extending between second edges of said side members to define a bottom of said beam-shaped member; said side members and said intermediate strip forming a substantially flat-bottomed V-shaped configuration;
   a plurality of fastening means being provided at said each fastening strip and substantially closely spaced along the surface of said fastening strip, said fastening means being shaped such as to penetrate into the building construction element upon pressing of said fastening strip against the building construction element for fastening said beam-shaped member to said building construction element; and
   at least one reinforcement member made as a separate piece and being provided on at least said intermediate strip at least in the interior of said V-shaped configuration, said reinforcement member extending in the longitudinal direction of said intermediate strip for increasing the bending strenght of said beam-shaped member, said reinforcement member being arranged across said intermediate strip to reach at least said second edges of said side members and being affixed to said V-shaped configuration or said thin-sheet metal member.

2. A beam according to claim 1, wherein said reinforcement member provided on said intermediate strip is dimensioned to be wider than said intermediate strip in a lateral direction thereof such as to at least slightly overlap at least one of said side members.

3. A beam according to claim 1, wherein said beam-shaped member is hot-dipped galvanized.

4. A beam according to claim 1, wherein said fastening means comprise studs which are provided with a transverse toothing or roughening.

5. A beam according to claim 1, wherein an area of interconnection between said second edges of said side members and said intermediate strip are rounded to at least partially surround the edges of said first reinforcement member so as to provide the substantial fixation of said V-shaped configuration and said at least one reinforcement member.

6. A beam according to claim 1, wherein the edges of said reinforcement member are provided with roughening or ribs for improving the engagement of said reinforcement member and wherein the width of said reinforcement member exceeds that of said intermediate strip such as to provide a tight fitting.

7. A beam according to claim 1, wherein said reinforcement member is secured to said intermediate strip by means of a supporting member shaped to correspond to the outside configuration of said intermediate strip and placed on the outside surface of said intermediate strip, said supporting member having bent side edges adapted to press said side members from outside, to force said at least one reinforcement member into position.

8. A beam according to claim 7, wherein said shaped supporting member is provided with fastening means including arrays of studs.

9. A beam according to claim 1, wherein at least said reinforcement member comprises a ribbed steel bar fitted into a tubular member at least partially constituting said intermediate strip.

* * * * *